C. W. PECK.
FABRIC MAKING MACHINE.
APPLICATION FILED NOV. 30, 1914.
1,207,205.
Patented Dec. 5, 1916.
5 SHEETS—SHEET 1.
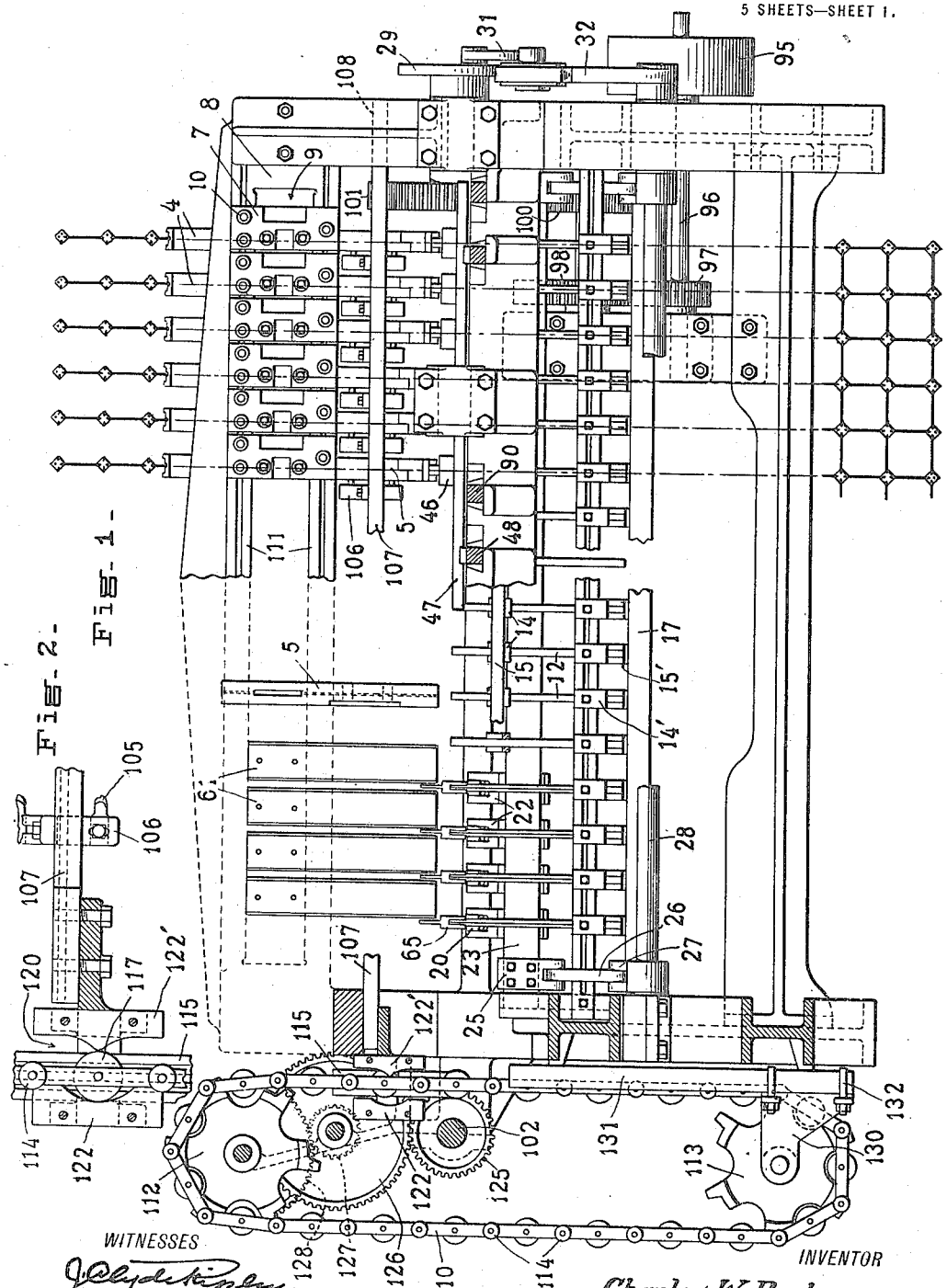
WITNESSES
INVENTOR
Charles W. Peck,
ATTORNEY

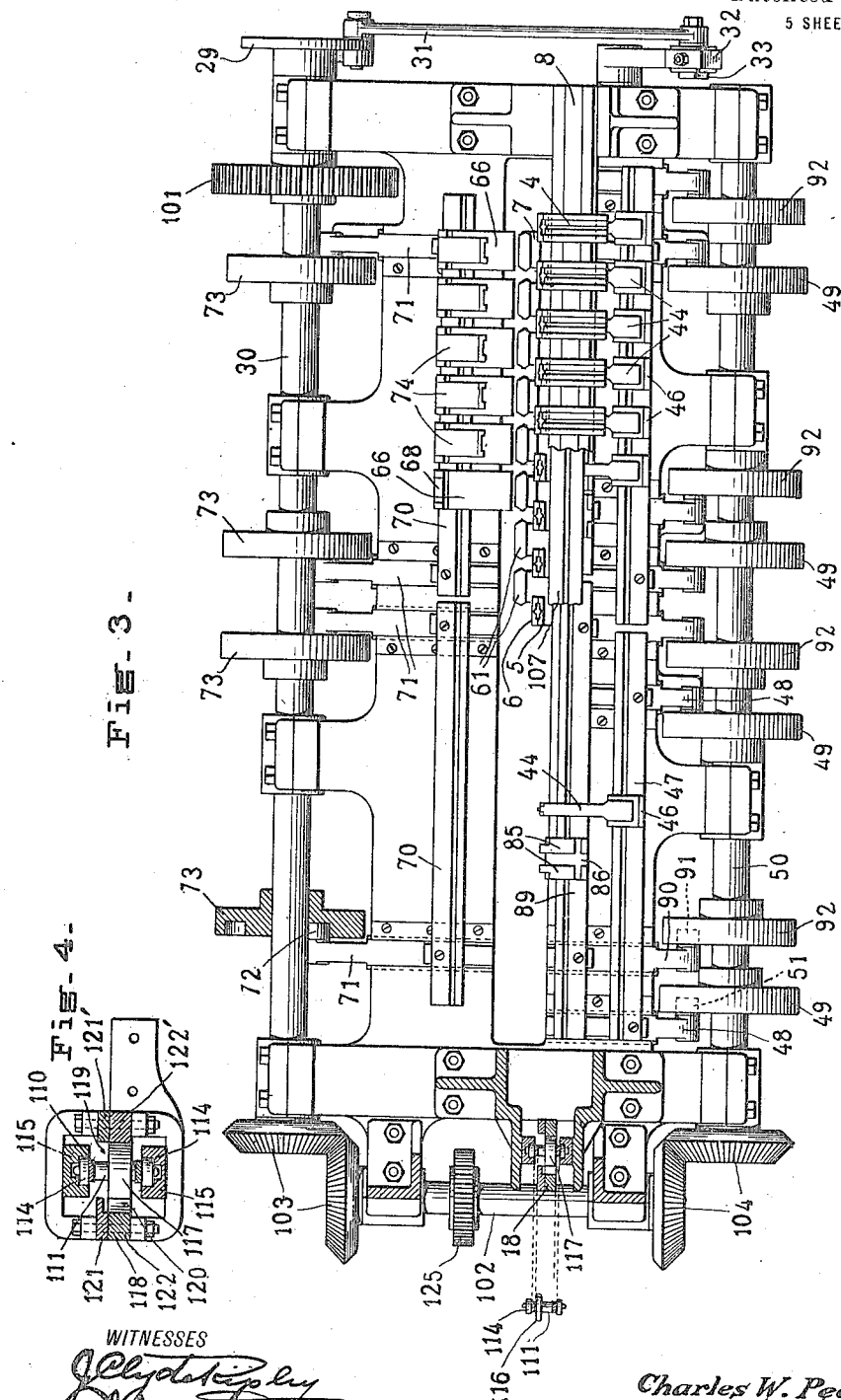

C. W. PECK.
FABRIC MAKING MACHINE.
APPLICATION FILED NOV. 30, 1914.
1,207,205.
Patented Dec. 5, 1916.
5 SHEETS—SHEET 3.
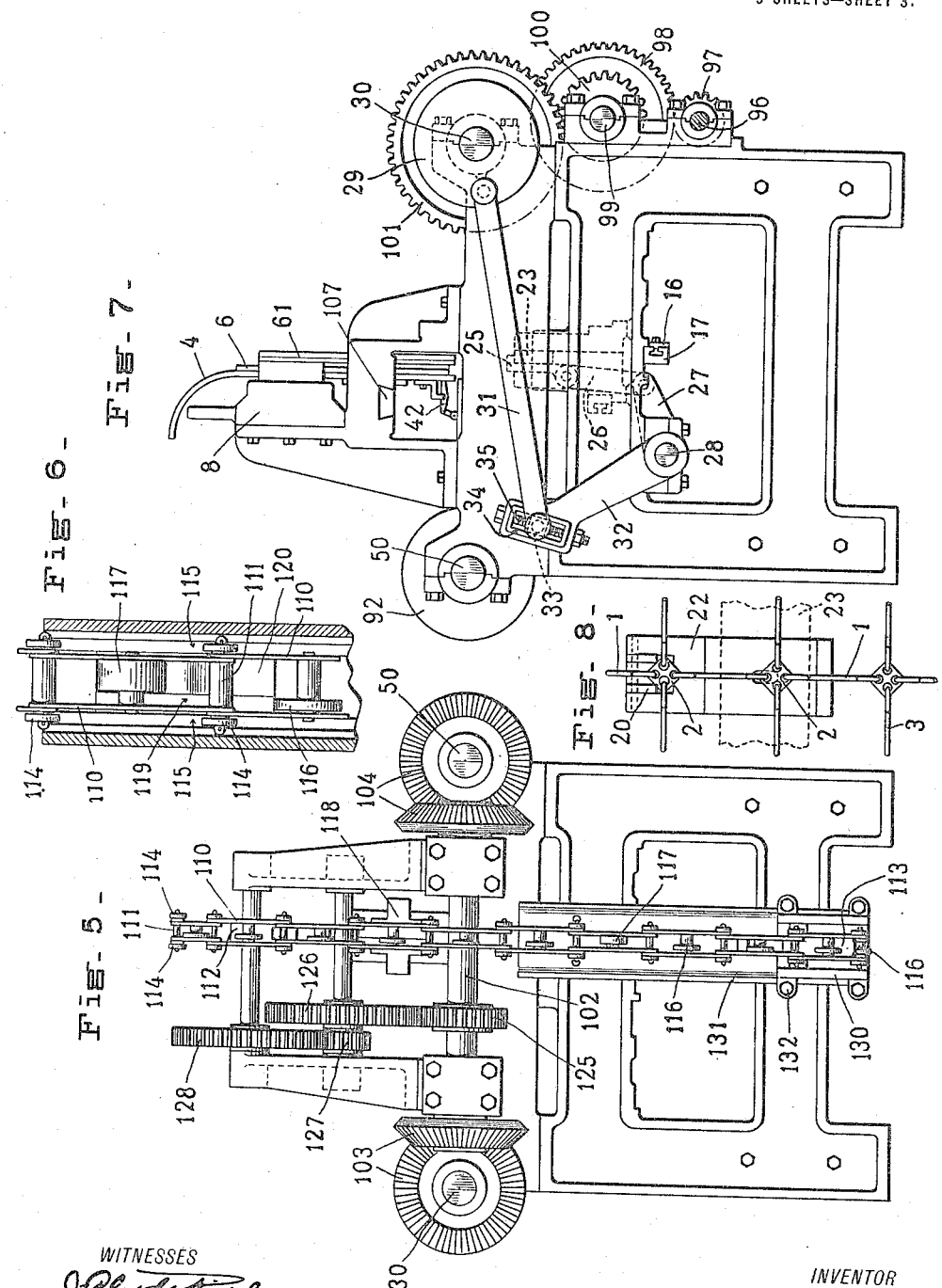
WITNESSES
INVENTOR
Charles W. Peck,
ATTORNEYS

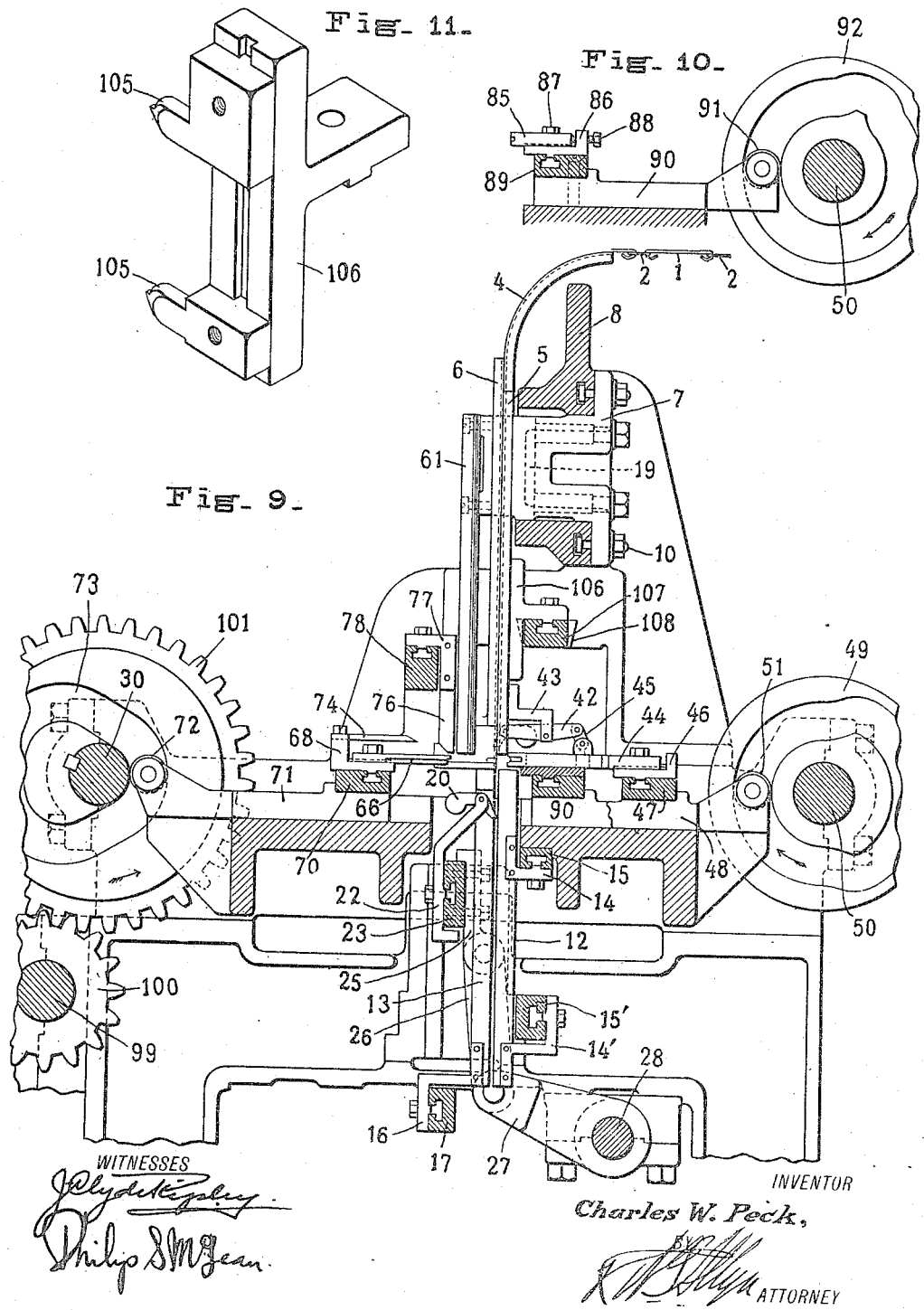

C. W. PECK.
FABRIC MAKING MACHINE.
APPLICATION FILED NOV. 30, 1914.
1,207,205.
Patented Dec. 5, 1916.
5 SHEETS—SHEET 5.
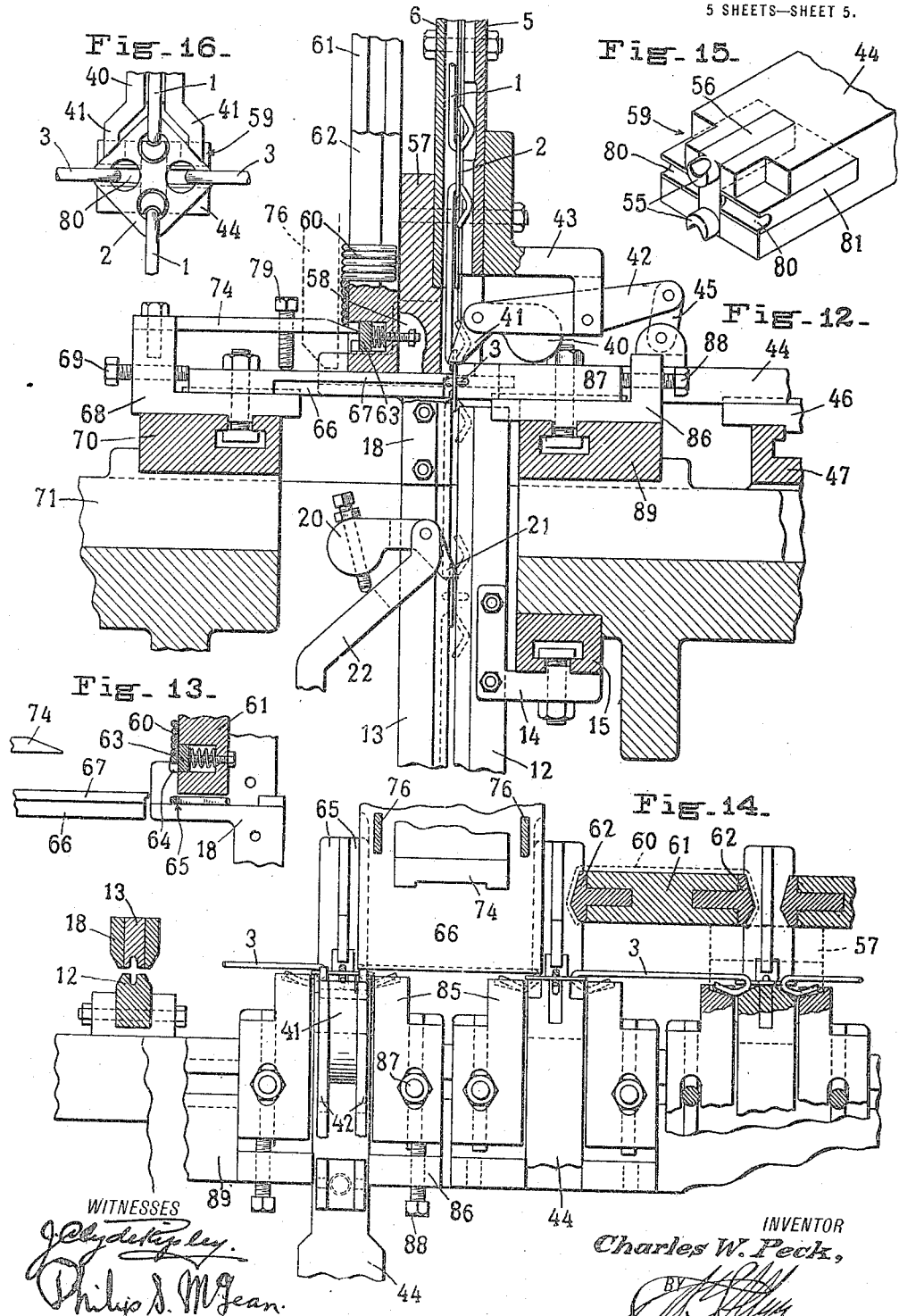

UNITED STATES PATENT OFFICE.

CHARLES W. PECK, OF WATERBURY, CONNECTICUT, ASSIGNOR TO THE MATTATUCK MANUFACTURING COMPANY, OF WATERBURY, CONNECTICUT, A CORPORATION OF CONNECTICUT.

FABRIC-MAKING MACHINE.

1,207,205.        Specification of Letters Patent.        Patented Dec. 5, 1916.

Application filed November 30, 1914. Serial No. 874,595.

*To all whom it may concern:*

Be it known that I, CHARLES W. PECK, a citizen of the United States of America, and residing at Waterbury, in the county of New Haven and State of Connecticut, have invented new and useful Improvements in Fabric-Making Machines, of which the following is a specification.

My invention has particular reference to mechanism for automatically connecting a series of strands by means of cross links. The mechanism is illustrated as applied to the handling of strands which consist of wire links and perforated plates.

The main object is to provide in such a construction for the handling of strands with different links and the use of different lengths of connecting links. This means that the machine has to be constructed and arranged so as to permit of many adjustments. These adjustments must be effected readily and the parts must have the arrangements, strength and capacity for alterations of position. In developing the various adjustments of the parts it will be found that many details of improvements are brought out.

The mechanism is intended to be operated continuously and it is therefore desirable to provide means for separating the product into suitable lengths. I have provided a simple and reliable mechanism for automatically determining the length of the fabric and this length may be varied as desired.

In the completed mechanism as shown and described a plurality of previously formed strands are led into the machine through suitable guides spaced apart from each other. Sufficient frictional resistance is afforded to hold the strands yieldingly in position. Intermittently the strands are pulled or drawn through the machine a distance equal to the length of a link and the plate. The length of the feed stroke and the position of the beginning of that stroke can both be adjusted by the same means. Suitable automatic devices are provided for moving each plate of the longitudinal strands accurately to the assembling position. The plates at the assembling position are centered and held ready for the insertion of the cross-links. The guides for the strands as well as the tension device, the draw-out, placer and centering devices are all laterally adjustable for different spacing between the strands. The cross-links are provided on guides located adjacent the spaces between the strands and are automatically fed to the assembling position so that the bent ends of the links pass through the side openings in the strand plates. As the hooks are inserted in the plates they are automatically bent over and closed down to hold the parts permanently together. As each link is fed forward a cut-off operates to hold up the remaining links on the link guide so as to keep them in proper position and yet permit the links to be automatically and regularly fed. These link guides and link feeding devices as well as the hook bending devices are laterally adjusted to correspond with the lengths of the cross-links. The cross-link feeding devices, the plate centering devices and the hook closing devices are carried by bars on slides operated by cams timed so as to effect the link feeding, centering and closing operation in the proper sequence.

The hooks on the strand links are opened somewhat at intervals of say 12 or 13 links more or less so as to permit a link to be removed and thus separate the product into the desired length of fabric. This automatic determination of the length of the fabric is effected by means of a slide with openers operated by a cam and a chain with a roll for coacting with the cam. The number of links in the chain correspond to the number of links in the completed fabric so that by increasing or diminishing the number of links in the chain the length of the fabric may be correspondingly increased or diminished.

The invention in its preferred form is illustrated in the accompanying five sheets of drawings.

Figure 1 is a front elevation of the machine, parts being broken away and other parts omitted so as to show the parts which would otherwise be concealed. Fig. 2 is an enlarged detail view of a part of a strand opener, the operating cams and chains. Fig. 3 is a plan view of the machine, parts being broken away, other parts being in section and other parts being omitted in order to illustrate parts which would otherwise be concealed. Fig. 4 is a horizontal sectional view showing the operating chain and cam for the strand opener. Fig. 5 is a vertical projection from the left-hand end of Figs. 1 and 3 showing the strand opening chain and driving mechanism. Fig. 6 is a detail vertical sectional view of the chain guide. Fig. 7 is a vertical projection taken from the right-hand end of Figs. 1 and 3 and showing the driving connections of the strand feed or draw-out. Fig. 8 is a detail view of one of the strand feeding or draw-out devices. Fig. 9 is a vertical sectional view of part of the chain showing the strand guide and the mechanism for feeding cross-links. Fig. 10 is a detail vertical section showing one of the link clenching dies and operating cam. Fig. 11 is a perspective view of a holder with a pair of strand link opening wedges. Fig. 12 is a vertical sectional view similar to Fig. 9 but on a larger scale showing parts of the strand guides, draw-out and placer mechanism and the cross link supply, feeding and clenching mechanism. Fig. 13 is a detail view illustrating the link supply and feed at another step in the operation. Fig. 14 is a plan view and partial section showing parts of the strand guides, plate centering devices, link supply, feeding, curling and clenching tools. Fig. 15 is a detail perspective view of the end of a member carrying a pair of plate centering prongs and link hook curling dies. Fig. 16 is a detail view showing a plate with placing and centering devices and the link hook curling dies in position.

*Fabric.*—In the preferred form of fabric the longitudinal strands are made up of hooked links 1 and perforated plates 2. These strands may be made in any suitable way, by hand or in an automatic machine, and may be passed into this machine either direct from the strand assembling position or from reels as may be convenient or desirable. The present machine is concerned with the automatic connecting of the strands by means of cross-links 3.

*Upper strand guides.*—The strands are guided in the machine from the rear over curved guides 4 and then pass down through vertically grooved and slotted guides to the assembling position and thence are drawn out at the bottom. The introductory guide for each strand consists of the back and front parts 5 and 6 connected to a block 7 which is mounted in the cross-piece 8. This cross-piece has an opening 9 extending across the machine so that the block 7 may be laterally adjusted to any extent desired. This block may be clamped to the cross-piece by means of nuts and bolts 10, the heads of the bolts fitting in under-cut slots or channels 11 in the cross-piece. In this way the upper strand guides and the parts carried thereby can be adjusted from side to side of the machine.

*Lower strand guides.*—Below the assembling position the strands are guided by the grooved bars 12 and 13 at the back and front respectively. The guide bar 12 has brackets 14 and 14' supported by grooved cross-bars 15 and 15' so that the guides 12 may be laterally adjusted in the same way as the upper guides. The guide 13 has a bracket 16 supported by a grooved cross-piece 17 at the lower end so that it may be adjusted laterally in the same manner. The upper end is secured to a throat piece 18 just below the assembling position.

*Strand tension.*—A suitable frictional tension device 19 may be provided carried in the front of the block 7 for each strand guide so as to yieldingly hold the strands in the guides.

*Strand feed or draw-out.*—Each strand is adapted to be intermittently pulled down or fed by means of a pawl 20 having fingers 21 which extend at each side of the front guide bar 13 and are adapted to engage the edges of the plates. This pawl is pivotally carried by a member 22 and is weighted at its upper end so that it may yield on the lifting movement to pass over the plates and will then be tilted into its operative position when it passes the upper edge of a plate. The member 22 is supported by the grooved cross piece 23 so that it may be laterally adjustable to correspond with the lateral position of the guide 13. The cross piece 23 has brackets 25 at its opposite ends and is suitably guided so as to permit of vertical movement. Each bracket 25 is connected by a link 26 to an arm 27 on the shaft 28. This shaft is adapted to rock back and forth from the crank disk 29 on the shaft 30. This crank disk is connected by link 31 to the arm 32 on the shaft 28. The crank disk 29 rotates at a constant speed and thus oscillates the arm 32, shaft 28 and arm 27 and thus moves the cross piece 23 and all the draw-out pawls 20 intermittently. The link 31 is connected to the arm 32 by means of a block 33 in the inclined slot 34. This block is adapted to be adjusted longitudinally of the slot by means of a screw 35. In this way the distance of the block 33 from the center of the shaft 28 may be adjusted and simultaneously the angular position of the arm 32 may be adjusted relative to the crank disk 29. If the crank be considered stationary it will thus be seen that an adjustment of the block 33 outward in the slot 34 will move the arm 32 toward the left and thus raise the arm 27, link 26, cross piece 23 and the draw-out pawls. At the same time the movement of the block 33 outward in the slot 34 increases the effective length of the arm 32 and thus decreases its angular movement for a given movement of the crank disk 29 so that simultaneously the initial position of the draw-out pawl 20 is raised and the length of its effective stroke is decreased. Such an adjustment corresponds to the effective feeding of a strand having a shorter length of link. The opposite adjustment of the block 33 in the slot 34 will lower the initial position of the draw-out pawl 20 and at the same time increase the length of the feeding and draw-out stroke to correspond with the greater length of strand link.

*Plate spacing.*—A pawl 40 having two angularly disposed fingers 41, 41 is pivotally carried by the front end of the lever 42. This lever is supported pivotally from the bracket 43 at the back of a strand guide and is connected to the member 44 by means of a toggle link 45 so that as the member 44 is moved in and out the pawl 41 is moved up and down. The pawl is weighted at its rear end so that it will automatically come into its proper position as the plate slides down beneath its forked or inclined fingers. The member 44 is mounted on a support 46 which is laterally adjustable on the bar 47. This bar is carried by slides 48 each of which is adapted to be reciprocated by the cam 49 on the shaft 50. This cam is of a box type with a suitable groove to accommodate the roll 51 on the slide 48 so as to move it in and out at the proper time. The member 44 is clamped to the part 46 by a bolt 52 and adapted to be adjusted by a bolt or screw 53. The placer lever 42 being carried by the strand guide it is also maintained in its proper relation to the strand even though the strand guide be laterally adjusted. The toggle action of the link 45 releases the placer pawl 41 just as the centering prongs 55 enter the plate so as not to cramp the action.

*Plate centering.*—A pair of projections 55, 55 on the front end of the member 44 are adapted to be projected or inserted into the upper and lower holes of the strand plate below and above the upper and lower attaching hooks respectively of the strand links so as to center the plate and hold it properly. These two projections are carried by a piece 56 inserted into the end of the member 44. The member 57 the lower end of the upper front strand guide 6 serves to hold the link and plate at the assembling position against the pressure of centering prongs 55. This member 57 is secured to the upper part 58 of the throat member whose lower part 18 is secured to the upper end of the lower front strand guide 13. The corners of the member 44 are cut out at 59 to allow for the forked ends 41 of the spacing pawl 40.

*Cross link supply.*—The partially formed cross links such as 60 with their ends in hooked-form are supplied on guides or holders 61 each of which is secured at its upper end to the front of the carrier block 7 along side of the strand guide. These guide holders are provided at their edges with gibs 62 which are adjustable so that different lengths of links are accommodated. A spring pressed cut-off 63 mounted in the lower end of the holder 61 is provided with projections 64 adapted to support the opposite ends of a link when the cut-off is in its outward position. Below the guide holder are supporting flanges 65 on the throat member which are adapted to support the ends of a link which has been dropped onto them. A feed plunger 66 or slide has flanges 67 which travel on the throat flanges 65. This slide 66 is adapted to feed the cross links to the assembling position. Each feed plunger 66 is clamped to a holder 68 and is adapted to be adjusted by a screw 69. The holder is mounted on a grooved bar 70 so that the holder and feed plunger may be adjusted laterally of the machine. The grooved bar 70 is supported on slides 71 at each end and this slide carries a roller 72 engaging in the groove of a box cam 73 on the shaft 30. A cut-off knife 74 is also carried by the holder 68 so that it moves forward with the feed plunger 66. The forward end of the cut-off knife engages between the two lower links supported on the cut-off 63 and by its inclined upper surfaces raises the upper links as it moves toward the cut-off. The continued movement of the cut-off knife moves the cut-off inward and retracts the projection 64 from beneath the link supported thereon. This permits the link to fall onto the upper surface of the feed plunger 66. Strippers 76 are provided to prevent the link which rests on the top of the plunger 66 being moved as the plunger is retracted from the assembling position. When the plunger is drawn from beneath the link, the link falls onto the throat flanges 65, 65 and is ready to be moved to the assembling position on the next feed stroke of the plunger 66. As the cut-off knife 74 is retracted the cut-off 63 is pushed outward by its spring so as to intercept the links released by the knife. The vertical position of the knife 74 may be adjusted by a clamp screw 79 so as to bring the operative edge of the knife into its exactly proper position for just clearing the link supported on the projection 64 of the cut-off. If we consider the machine as just starting, all the links will be supported upon the cut-off. As the holder 68 is moved toward the links, the knife passes between the two lower links on the cut-off, pushes the cut-off inward and this releases the lower link which falls on the top of the plunger 66. As the holder and knife and plunger are retracted, the cut-off springs out and intercepts the falling column of links and the link which was on the top of the plunger 66 falls onto the flanges 65. On the next feed stroke the link on the flanges 65 is fed beneath the link guide holder to the assembling position, the knife 74 passes between the two lower links on the cut-off 63 as before mentioned, holds up all of the links except the one resting on the projection 64 and then pushes in the cut-off 63 which releases the link from the projection 64 and permits it to fall onto the top of the plunger 66. This construction is such that the links are regularly and uniformly fed without danger of sticking or attempting to feed two at a time.

*Cross link closing.*—The member 44 which carries the centering prongs 55 also carries curling dies 80 on opposite sides against which the bent or hooked ends of the cross link 60 are forced as the cross link is fed. This curls over the ends of the links as they pass through the strand plates but does not close them tight. The curling faces are preferably carried by a cross piece 81 set in the end of the member 44 at right angles to the piece 56. In this way it is possible to make the wearing parts of hardened steel so that they may be readily replaced when desired. Opposite the link feeding slide 66 and between the two adjacent centering and curling members are mounted a pair of clenching dies 85, one for each end of the link. These dies are carried by a holder 86 being clamped by bolts 87 and separately adjustable by screws 88. Each clenching die 85 of a pair is adjustable laterally on its holder to correspond with links of different lengths. The holders 86 are all mounted on a grooved bar 89 and adjustable laterally for different spacing of strands and fabrics of different widths. The bar 89 is supported on slides 90, each of which has a roller 91 in a groove in the cam 92 on shaft 50. The bar 47 is above the slides 90 and the centering and curling member 44 slides over the bar 89 between the clenching dies.

*Driving train.*—Power is supplied in this instance to the pulley 95 on the shaft 96 and transmitted by gear 97 to gear 98 on shaft 99. This latter shaft has a gear 100 which meshes with gear 101 on shaft 30. The end shaft 102 is driven from shaft 30 by miter gears 103 and in turn drives shaft 50 by miter gears 104. Shaft 30 drives the draw-out or strand feeding mechanism through the medium of the crank disk 29, link 31, arm 32, shaft 28, arm 27, link 26 and the grooved cross bar 23 which carries all of the draw-out pawls 20. This shaft 30 also operates all of the cross link feeding mechanism through the medium of two pairs of cams 73, slides 71 and grooved bars 70. Each bar 70 carries one-half of all of the holders 68 which carry the link feeding plungers 66 and cut-off knife 74. The end shaft 102 drives the strand link opening mechanism which will be hereinafter described. The shaft 50 carries all of the cams 49 for operating the slides 48 which carry the grooved cross bars 47. Each cross bar 47 supports one-half of all of the members 44 having the strand plate centering and cross link curling dies and operating the plate placing tools. This shaft 50 also has two pairs of cams 92, each pair of which operates a pair of slides 90 carrying the grooved bars 89, each of which supports one-half of the cross link clenching dies.

*Length determining.*—It is preferred to run the longitudinal strands into the machine and out again in continuous lengths so as to avoid interruption and afford continuity of action. I accordingly provide means for automatically partially opening the hooks of a link at intervals depending upon the desired length of the fabric so that it will be possible to disconnect a link after the fabric comes out of the machine. This is accomplished by wedge-like opening tools such as 105. A pair of these tools is carried by a holder 106, and each is vertically adjustable thereon so as to bring the spaces between the operative tips to correspond with the length of the particular link of the strands. A holder 106 and its two opening wedges is provided for each strand and all of the holders are mounted on a grooved cross bar 107 so that they may be longitudinally adjusted thereon to correspond with the positions of the vertical strands. This bar 107 is dove-tailed on its ends and fits in correspondingly shaped grooves 108 in the frame of the machine so that the bar and the openers may be moved at the proper time to open the desired links. The opening movement is effected by means of a chain, guide and cam construction. The chain consists of a number of links such as 110 connected by pins 111 which serve to engage the teeth of the sprockets 112 and 113. These pins carry rollers 114, 114 at their opposite ends which are guided vertically in grooved or channel-like guides 115. This chain carries a narrow roller 116 in each of its links except one and in that link carries a wider roller 117. The narrow rollers are all at one side of the chain and the wider roller is at the opposite side of the chain. A cam-like box or frame 118 secured to the end of the movable bar 107 has grooves 119 and 120 for coöperating with the rollers 116 and 117 in the chain respectively. Groove 119 is formed by plates 121 and 121′ and extends straight up and down. The cam groove 120 is formed between plates 122 and 122′ for moving the cam frame and the bar 107 and the link opener 105 at the proper intervals. The construction and proportion of the parts is such that one of the rollers 116 or 117 is always engaging one of the grooves of the cam frame so as to hold it definitely in position. For instance, when one of the rollers 116 is about to leave the upper end of the slot 119, the succeeding roller 116 comes into the bottom of the cam slot 119 or the roller 117 comes into the bottom of the slot 120. It will thus be seen that the movement of the cam frame and the bar 107 is positively controlled by the chain, the chain on its part being guided vertically by the guides 115. The chain is driven from the end shaft 102 by the gears 125, 126, 127 and 128 in proper proportional time to the number of strokes of the draw-out mechanism. As previously described there is one draw-out feeding stroke for each revolution of the shaft 30 and crank disk 29. In the arrangement shown the ratio between the gears 103 being unity, shaft 102 rotates at the same angular speed as the shaft 30. The ratio between the gears 125 and 126, 127 and 128 is such that gear 125 rotates six time for one rotation of the gear 128 and the sprocket 112. The sprocket 112 having six teeth, the chain is fed one link for each rotation of the shaft 102. It will thus be seen that with one opening roller 117 the strand links of the fabric will be partially opened once for each complete travel of the chain, consequently the number of strands in the finished fabric will be equal to one less than the number of links in the chain since the link which is partially opened is removed. The number of links in the strand of the fabric can thus be readily changed by adding to or subtracting from the number of links in the chain. As this changes the length of the chain I have provided means for adjusting the position of the lower sprocket 113. This sprocket is supported on a bracket 130 which is slidably secured to the channel 131 by means of clamps 132. It will be understood of course, that the product is not actually separated into lengths in the machine but that the strand links are simply partially opened so as to permit certain links to be readily removed and thus divide up the product into fabrics of the definite desired lengths.

What I claim is:—

1. In a machine of the character described, vertical strand guides having grooves for the links and grooves for the plates, curved introductory guides extending over the top of the machine for straightening out the links and plates of strands and leading to said vertical guides, means for connecting said strands by cross links, and means for pulling down the product.

2. In a machine of the character described, a frame having bars grooved at the back and with an open space between said bars extending across the machine, carrier blocks adjustably mounted in said space and secured by bolts in said grooved bars, and strand guides secured to said blocks at the front of the machine and adjustable with said carrier blocks.

3. In a machine of the character described, lower strand guides, a grooved bar extending across the machine, brackets bolted to said bar and supporting said guides and adjustable as desired across the machine, and means for connecting the strands by cross links.

4. In a machine of the character described, a plurality of strand feeding pawls, supports therefor, a cross bar having a continuous groove throughout its length, means for securing said supports in the groove of said bar whereby said supports and their feeding pawls may all be adjusted longitudinally of said bar to any desired extent, and means for moving said bar to operate said pawls.

5. In a machine of the character described, a strand guide, a reciprocating member, a forked pawl hinged to said member and embracing said guide to engage a strand guided therein, and means for reciprocating said member.

6. In a machine of the character described, a strand feeding device, means for operating said device, and means for simultaneously adjusting the length of feeding stroke and the position of the stroke of said feeding device.

7. In a machine of the character described, a strand feeding device, means for operating said device, and means for simultaneously adjusting the position of the beginning of the feeding stroke and the length of said stroke.

8. In a machine of the character described, strand feeding mechanism including an oscillating arm and an operating link connected thereto, and means for simultaneously adjusting the point of connection to change the effective radius of the arm and the angular position of the arm.

9. In a machine of the character described, a crank disk, a shaft, two arms connected to said shaft, a link adjustably connecting said disk with one arm, and a feeding device connected to the other arm.

10. In a machine of the character described, a strand feeding device, a plate placing device, a plate centering device, and means for assembling a cross link in a plate.

11. In a machine of the character described, a plate placing member, a plate centering member connected thereto, means for operating said members successively and independent means for feeding a strand past said members.

12. In a machine of the character described, plate centering means comprising a lever, a pawl hinged thereto and having forked arms for engaging the edges of a plate, a slide, and a toggle link connecting said slide and lever.

13. In a machine of the character described, a plate placing member, a plate centering member, means for feeding a strand past said members and means for operating and releasing said placing member before said centering member operates.

14. In a machine of the character described, a single grooved bar, a plurality of strand-centering devices bolted into the groove of said bar and adjustable across the machine as desired, and means for operating said bar and centering devices.

15. In a machine of the character described, two parallel bars, a set of strand centering devices carried by one bar, and a set of cross link closing devices carried by the other bar, one of said sets of devices overlying the other, and means for operating said bars and devices successively.

16. In a machine of the character described, a slide, a bifurcated plate secured in the end thereof and having two curling dies, and a cross plate between said curling dies having centering prongs.

17. In a machine of the character described, a plate centering device, a holder, and a link-closing die carried by said holder at each side of said centering device and adjustable therewith.

18. In a machine of the character described two plate centering devices, and two link-closing dies mounted between said devices and independently adjustable therebetween.

19. In a machine of the character described, a grooved cross piece, a plurality of link-closing dies carried thereby and adjustably bolted into the groove of said bar, and means for operating said bar and dies.

20. In a machine of the character described, a link guide having adjustable edge gibs, adjustable link supporting flanges, and a feed plunger.

21. In a machine of the character described, cross link guides, a grooved bar, a plurality of link feeding plungers bolted to said grooved bar and adjustable thereon, and cam operated slides carrying said bar and plungers.

22. In a machine of the character described, a link guide, a cut-off at the lower end thereof, a knife for operating said cut-off, and a feed plunger below said cut-off.

23. In a machine of the character described, a link guide, a cut-off at the lower end thereof, a knife for operating said cut-off, a feed plunger below said cut-off, a support below said guide, and a stripper above said plunger.

24. In a machine of the character described, a link guide, a spring pressed cut-off, a knife for operating said cut-off, means for adjusting said knife, and a feed plunger.

25. In a machine of the character described, a reciprocating bar having a groove extending throughout substantially its entire length, a plurality of holders secured in said groove and adjustable along said bar, and an opening wedge carried by each holder and adjustable thereon.

26. In a machine of the character described, a strand guide, means for drawing a link strand through said guide, a link opener, a chain for operating said opener, and means for feeding said chain one link for each link of the strand.

27. In a machine of the character described, a strand link opener, a cam frame connected thereto, and a chain for intermittently operating said cam frame.

28. In a machine of the character described, a frame having a straight locking groove and a cam operating groove, and a chain for operating said frame and having rollers for entering said grooves to lock and operate said frame respectively.

29. In a machine of the character described, a frame having a locking groove and a cam operating groove, a stationary guide, a chain engaging said guide, and means carried by said chain for co-acting with said locking and cam groove respectively.

30. In a machine of the character described, a strand opener, a cam, an operating chain therefor, two sprockets for said chain, means for rotating one sprocket, and an adjustable support for the other sprocket to permit it to be moved to accommodate changes in the number of links in the chain.

31. In a machine of the character described, a strand feeding device, and means for simultaneously adjusting the point of beginning of the effective feeding stroke and the end of the effective feeding stroke.

32. In a machine of the character described, two centering devices spaced apart from each other, link-closing dies mounted on each side of each centering device, the two closing dies between the centering devices being independently adjustable.

33. In a machine of the character described, two centering devices spaced apart from each other, link-closing dies mounted on each side of each centering device, the closing dies between the centering devices being independently adjustable, and the two dies associated with one centering device being simultaneously adjustable.

34. In a machine of the character described, a vertical link guide, a spring-pressed link retarder carried thereby, and a horizontally-movable link-feeding plunger operable beneath said guide.

35. In a machine of the character described, a vertical link guide, an alining device arranged with a face spaced apart from but substantially parallel with the one face of said guide, and a horizontally-movable feed-plunger operable beneath said guide and said alining device.

36. In a machine of the character described, a vertical link guide, a feed plunger horizontally movable beneath said link guide, and a yielding device for engaging a link immediately above said plunger.

37. In a machine of the character described, a vertical link guide, a horizontally-movable feed-plunger beneath said link guide, an alining device above said plunger and adjacent one face of said guide, and a yielding device for engaging a link adjacent the feeding face of said plunger.

38. In a machine of the character described, a vertical guide, a horizontally-movable feed-plunger operable beneath said guide, means for preventing the return movement of a link when the feed plunger is retracted, and means for holding back all of the links on said guide when the link in front of said plunger is being fed.

39. In a machine of the character described, a holder, a member removably carried thereby and having upper and lower hardened plate centering elements, and another member removably carried by said holder having hardened link-closing dies on opposite sides of said plate centering element.

40. In a machine of the character described, feeding mechanism including a rotating driving shaft, a rock shaft, a feeding device connected to said rock shaft, an arm element oscillatable with said rock shaft, a link element connecting said arm element and said drive shaft, one of said elements having a guide inclined relative to its length, and the other element being adjustably mounted on said guide whereby the effective length of said arm element and its angular position of movement may be simultaneously adjusted.

CHARLES W. PECK.

Witnesses:
W. E. FIELDING,
F. K. TERRELL.

Copies of this patent may be obtained for five cents each, by addressing the "Commissioner of Patents, Washington, D. C."